(No Model.)

G. E. PALMER.
SET LINE SNAP.

No. 542,803. Patented July 16, 1895.

WITNESSES:
Chas. W. Marvin
Jessie E. Murray

INVENTOR
George E. Palmer.

BY
Smith & Bridson
ATTORNEYS.

UNITED STATES PATENT OFFICE.

GEORGE E. PALMER, OF ELMIRA, NEW YORK.

SET-LINE SNAP.

SPECIFICATION forming part of Letters Patent No. 542,803, dated July 16, 1895.

Application filed September 4, 1894. Serial No. 522,059. (No model.)

*To all whom it may concern:*

Be it known that I, GEORGE E. PALMER, of Elmira, in the county of Chemung, in the State of New York, have invented new and useful Improvements in Set-Line Snaps, of which the following, taken in connection with the accompanying drawings, is a full, clear, and exact description.

This invention relates to snaps, and more particularly to set-line snaps used in set-line fishing.

My object is to produce a snap of the class described by which I am enabled easily, conveniently, and quickly to attach and detach the small lines to which the hook is secured to the main line, cheap and durable in its its construction, effective in its operation, and of great utility; and to that end my invention consists in several new and novel features and combination of parts hereinafter described, and which are specifically set forth in the claims hereunto annexed.

It is constructed as follows, reference being had to the accompanying drawings, in which—

Figure 1:
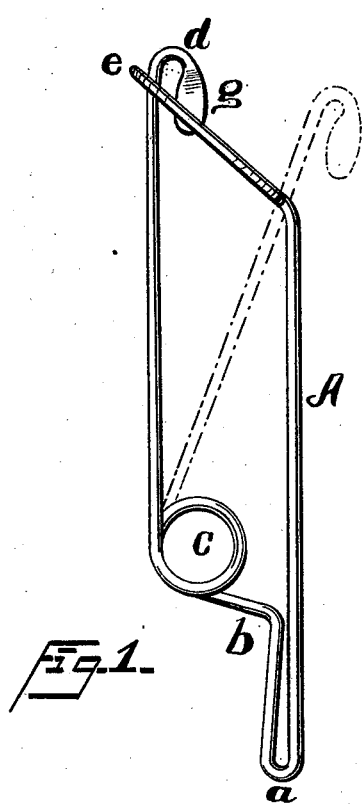
Figure 2:
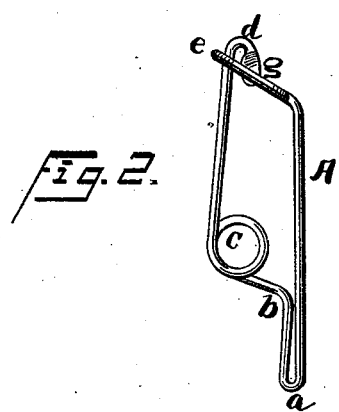
Figure 3:
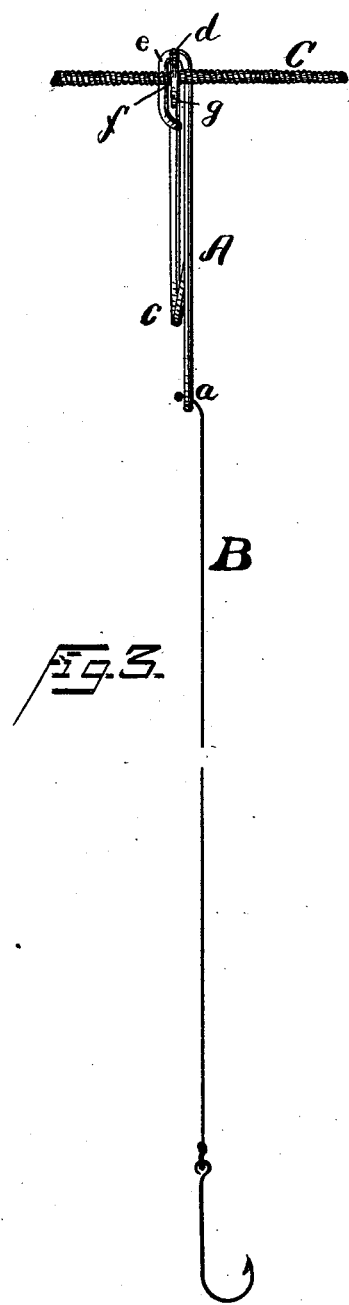

Figure 1 is a side view of the snap complete, enlarged, showing the operating end as it appears when it has been released, (in dotted lines.) Fig. 2 is a side view thereof as it appears in its normal condition. Fig. 3 is a frontage view thereof, showing the snap secured to the main line at its upper end and the short hook-line at its lower end.

Similar letters of reference indicate corresponding parts.

A is the snap constructed of a single piece of wire bent at a short distance from the center to form the loop or eye $a$; thence bent at $b$ obliquely, then bent to form a coil or eye $c$, thence extending upwardly and having a hook $d$ at its extreme end. The lower side of the hook $d$ is also provided with a lip $g$, which may be of any shape desired, and is adapted to grip the line for the purpose of preventing the snap from sliding thereon. The opposite end of the wire is bent obliquely at $e$, thence latterly to form an eye $f$, with which eye the hook $d$ is adapted to engage or transverse.

B is a hook-line having a knot at one end adapted to be passed down through and into the loop or eye $a$, where it is detachably secured. The coil $c$ serves to give a tension to the end of the wire upon which the hook $d$ is located.

It will be observed that when the operating end or hook is pressed forward, as shown in Fig. 1, the main line may pass up into the recess $g$, and thus when it returns to its original position it will be held tightly by the hook and the opposite end of the wire or upper face of the eye $f$. It will thus be observed that by simply taking the snap in the hand it may be pressed so as to readily and easily grip or release the main line C at will.

Having described my invention, what I claim, and desire to secure by Letters Patent, is—

1. A set-line snap comprising a piece of wire bent first to form a loop —$a$—, thence bent to form a coil —$c$—, thence to form the hook —$d$—, the opposite end bent diagonally and to form an eye —$f$— with which the hook —$d$— engages, substantially described in the purposes set forth.

2. A set-line snap, consisting of a piece of wire bent substantially centrally, first, to form a coil —$c$— thence having its end bent to form a hook —$d$—, said hook being provided with a lip upon its under side and the opposite end of the wire bent obliquely to form an eye with which the hook —$d$— engages, substantially as described for the purposes set forth.

In witness whereof I have hereunto set my hand this 29th day of August, 1894.

GEORGE E. PALMER.

In presence of—
JAMES M. MOCKLER,
E. A. PRENTICE.